Nov. 12, 1946.    B. G. HANSON    2,411,131
WINDSHIELD FOR MOTORCYCLES AND THE LIKE
Filed July 11, 1945    2 Sheets-Sheet 1

Inventor
BERGER G. HANSON

By *Clarence A. O'Brien
and Harvey B. Jacobson*
Attorneys

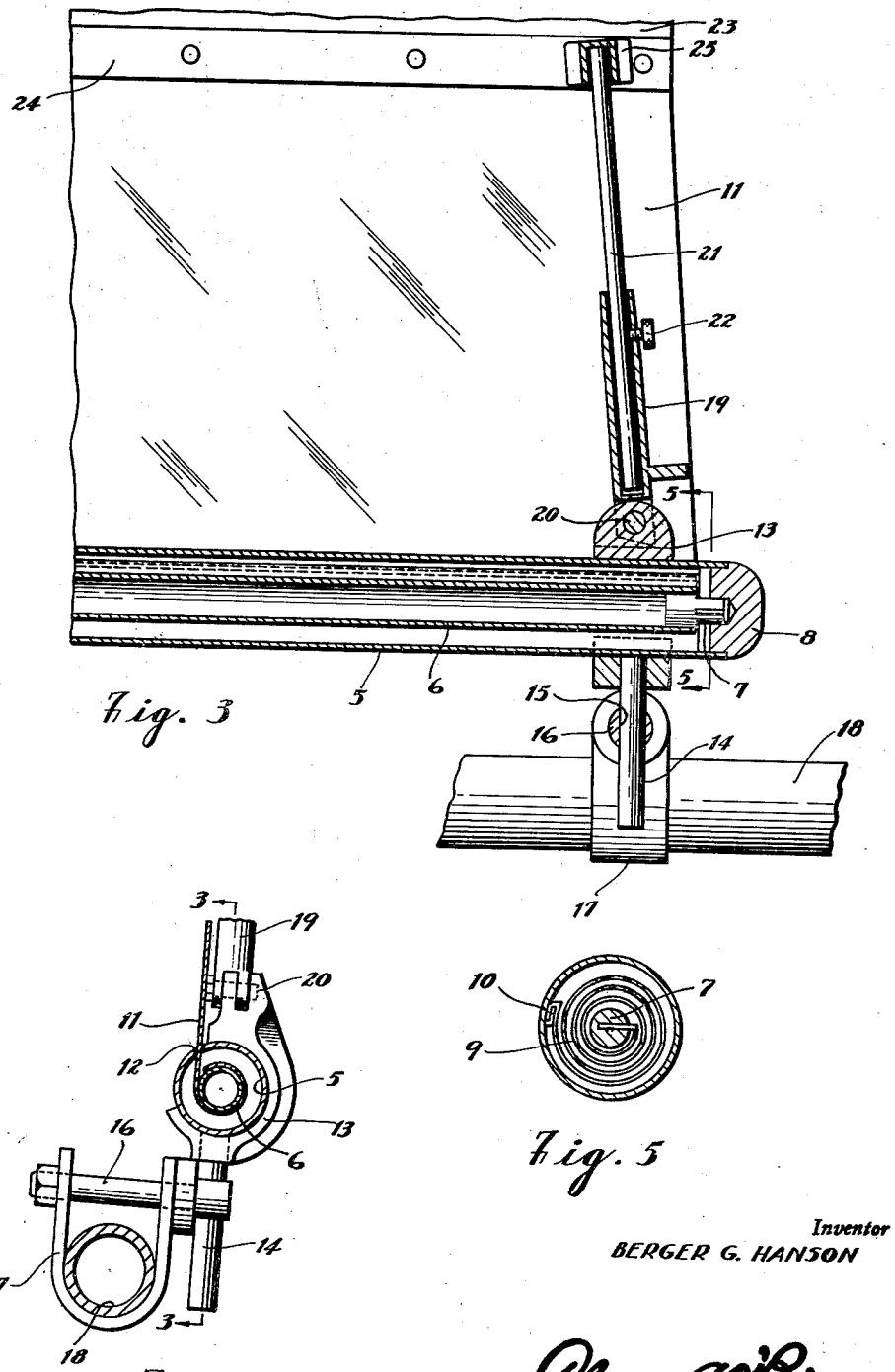

Patented Nov. 12, 1946

2,411,131

UNITED STATES PATENT OFFICE 2,411,131

WINDSHIELD FOR MOTORCYCLES AND THE LIKE

Berger G. Hanson, St. Charles, Ill.

Application July 11, 1945, Serial No. 604,477

2 Claims. (Cl. 160—24)

The present invention relates to new and useful improvements in windshield for motorcycles and similar vehicles and has for its primary object to provide a device of this character embodying a spring roller on which the windshield may be wound and paid out for movement into its raised or lowered position whereby the windshield may be conveniently carried on the motorcycle without necessitating removal therefrom when not in use and which at the same time is always available for use, when desired.

A further object of the invention is to provide a windshield attachment of this character which may be easily and quickly installed in operative position on the handle bars of a motorcycle or the like without necessitating any changes or alterations in the construction thereof.

A still further object is to provide a device of this character of simple and practical construction, which is efficient and reliable in use, neat and attractive in appearance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is an enlarged vertical sectional view of the spring roller and one of the vertical supports for the windshield substantially on the line 3—3 of Figure 4.

Figure 4 is a vertical sectional view taken substantially on the line 4—4 of Figure 1, and Figure 5 is a transverse sectional view of one end of the spring roller.

Figure 1:
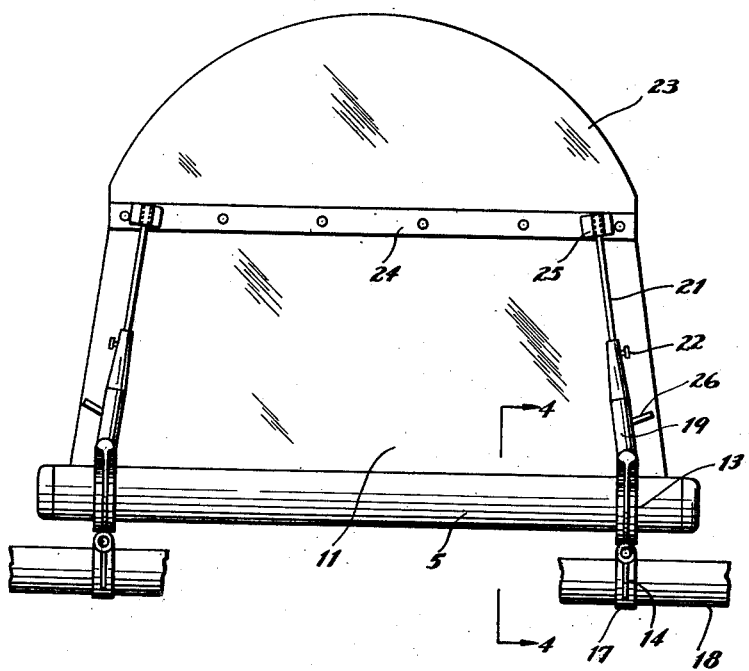
Figure 1 is a view in elevation showing the windshield in its raised position.

Referring now to the drawings in detail wherein for the purpose of illustration I have disclosed a preferred embodiment of the invention, the numeral 5 designates a tubular housing for a spring roller 6, the roller having trunnions 7 at the ends thereof journaled in plugs 8 in the ends of the housing.

To one end of the roller is attached a coil spring 9 having one end secured to the housing as indicated at 10 for maintaining the roller under tension to wind a flexible curtain such as cloth or the like 11 thereon through a longitudinally extending slot 12 in the upper portion of the housing 5.

The ends of the housing 5 are supported in a pair of brackets 13 having pins 14 extending downwardly from the lower portion thereof and inserted through a transverse opening 15 in one end of a bolt 16 connecting the legs of a U-shaped clamp 17 in clamping engagement on the handle bars 18 of a motorcycle or similar vehicle. The pins 14 are removably mounted in the bolts 16 for detaching the bracket 13 and spring roller housing 5 from the handle bars of the motorcycle, when desired, and without removing the clamps 17 therefrom.

Figure 2:
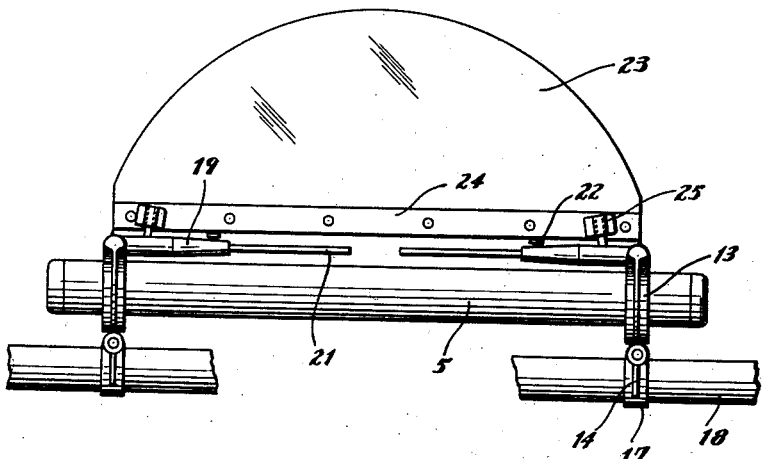
Figure 2 is a similar view showing the windshield in its lowered position.

A pair of tubular sockets 19 are pivoted at their lower ends on the upper portion of the bracket 13 by means of pins 20 for vertical swinging movement of the sockets into and out of a horizontal position on top of the housing 5 as indicated in Figures 1 and 2 of the drawings. Posts 21 are slidably mounted in the sockets 19 and are secured in vertically adjusted position therein by means of set screws 22.

A sheet of transparent material 23 forming an upper windshield section is secured to the upper edge of the cloth windshield section 11 by means of a rigid strip 24 and to the rear surface of which is secured a pair of sockets 25 adapted for receiving the upper ends of the posts 21 to support the windshield sections 11 and 23 in a raised position.

The sockets 25 are secured to the strip 24 in a slightly inclined position so that when the posts 21 are engaged therein the posts will be inclined inwardly from a perpendicular position.

Short posts 26 project laterally from the lower portion of the sockets 19 and are also inclined with respect to the socket 19 for insertion in the sockets 25 when the windshield is lowered and when the posts 21 are swung downwardly on top of the housing 5, the transparent windshield section 23 thus being supported in an upright position when the windshield is either in its raised or lowered position.

In the operation of the device when it is desired to raise the windshield the windshield sections 11 and 23 are pulled outwardly of the housing 5 and the posts 21 and sockets 19 are swung upwardly into the position as shown in Figure 1 of the drawings and the upper ends of the posts inserted in the sockets 25. The windshield is then supported in its upstanding position and the posts 21 brace the windshield against the force of wind to which the same is subjected during the operation of the motorcycle.

By releasing the sockets 25 from the upper ends of the posts 21 the posts may then be swung downwardly into a collapsed positioned as shown in Figure 2 of the drawings and the spring 9 will then wind the flexible lower section 11 of the windshield on the spring roller 6 and the transparent section 23 is then supported in an upright position on the pins 26.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is understood, however, that even though there is herein shown and described a preferred embodiment of the invention the same is susceptible to certain changes fully comprehended by the spirit of the invention as herein described and the scope of the appended claims.

What I claim is:

1. A windshield for vehicles of the class described comprising a flexible member, a casing carrying spring roller adapted for winding the member thereon from an extended positioned into the casing, a transparent member attached at the outer edge of the flexible member, and supporting means on the casing for the transparent member to maintain the latter in an upstanding position when the flexible member is either extended from or retracted into the casing.

2. A windshield for vehicles of the class described comprising a flexible member, a casing carrying spring roller adapted for winding the member thereon, a transparent member attached at the outer edge of the flexible member, a pair of posts pivotally carried by the casing for folding thereon, sockets carried by the transparent member adapted to receive the posts when in raised position to support the flexible and transparent members thereon, and lateral posts on the foldable posts adapted for engagement in the sockets when the first named posts are in folded position to support the transparent member upright in a lowered position.

BERGER G. HANSON.